G. C. KELLING.
PEANUT BLANCHER.
APPLICATION FILED AUG. 6, 1920.
1,388,574.
Patented Aug. 23, 1921.
4 SHEETS—SHEET 3.
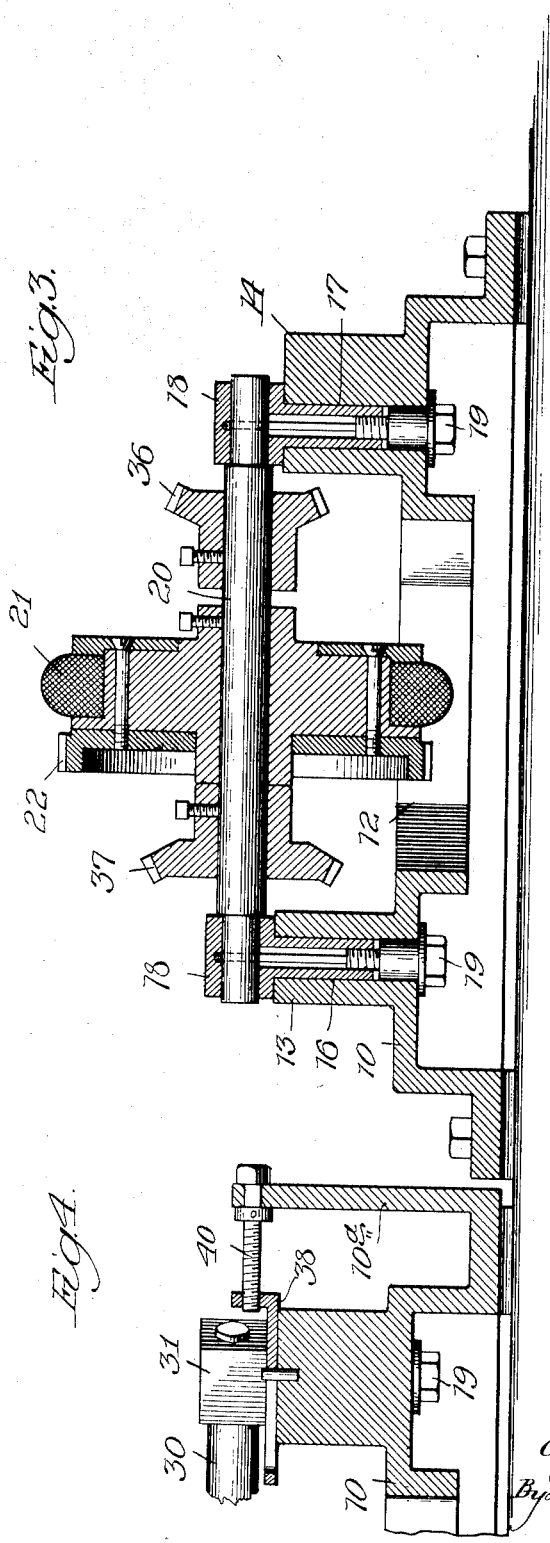

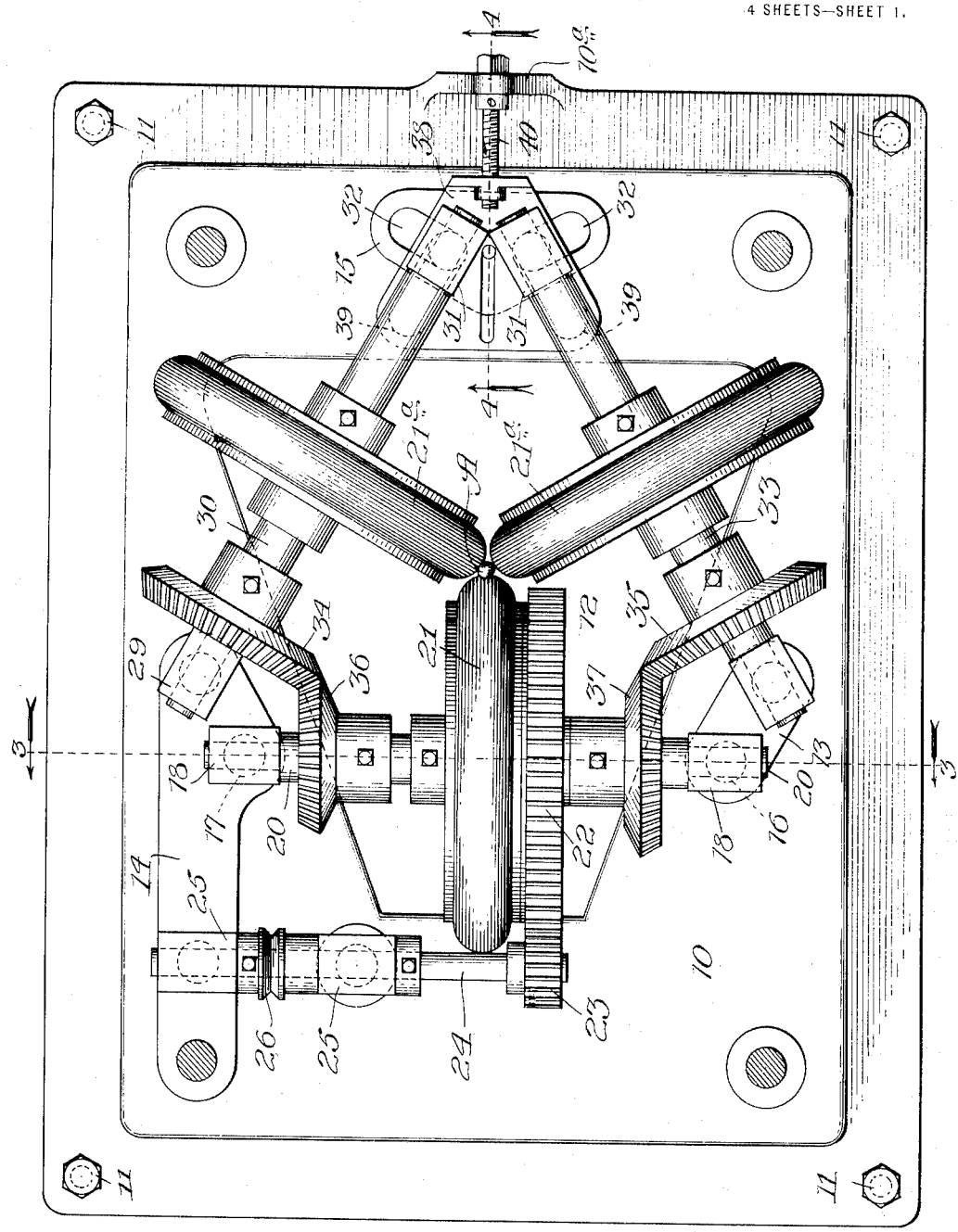

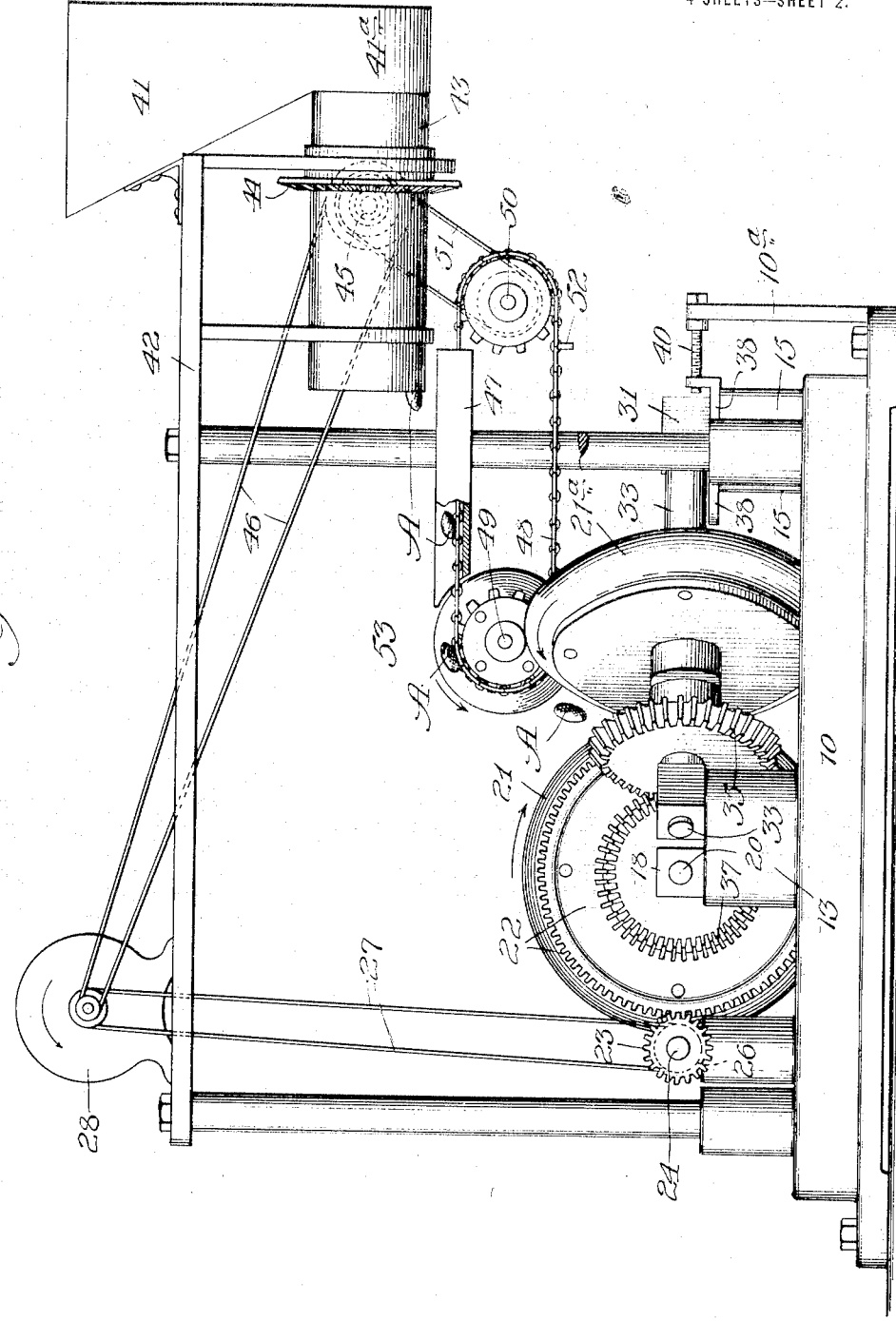

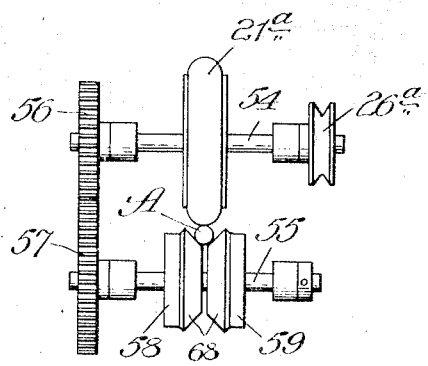
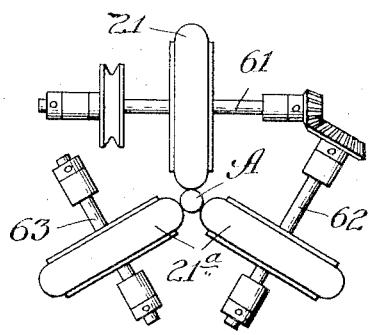
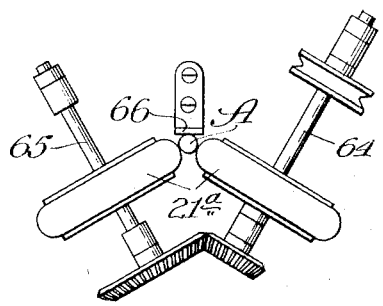

UNITED STATES PATENT OFFICE.

GUSTAVE C. KELLING, OF CHICAGO, ILLINOIS.

PEANUT-BLANCHER.

1,388,574.  Specification of Letters Patent.  Patented Aug. 23, 1921.

Application filed August 6, 1920. Serial No. 401,706.

*To all whom it may concern:*

Be it known that I, GUSTAVE C. KELLING, a citizen of the United States, residing at Chicago, in the county of Cook and State of Illinois, have invented a new and useful Improvement in Peanut-Blanchers, of which the following is a specification.

This invention relates to peanut blanchers and is fully described in the following specification and shown in the accompanying drawing in which Figure 1 is a plan view of the blanching rolls, Fig. 2 is a side elevation of the same showing the feeding mechanism, Fig. 3 is a transverse vertical section on the line 3—3 of Fig. 1, Fig. 4 is a partial vertical section on the line 4—4 of Fig. 1; Figs. 5, 6 and 7 are diagrammatic plan views of modified forms of blanching rolls.

In the embodiment illustrated the bed plate 10 is secured by screws 11 to any suitable form of support (not shown). This plate has a central opening 12 of a generally triangular form and bosses 13, 14 and 15 preferably of the same height are spaced about this opening. Holes 16 and 17 are formed in the bosses 13 and 14 respectively and bearings 18 having vertical extensions which are tapped at their lower ends are secured in these openings by means of screws 19. Thus the bearings 18 may be turned so as to be self-alining in a horizontal plane.

A shaft 20 is journaled in the bearings 18 and carries a wheel 21 to which is secured a gear 22. This gear is driven by a pinion 23 on the shaft 24 which is journaled in bearings 25 which are similar to the bearings 18. The shaft 24 carries a grooved pulley 26 which is driven by means of a round belt 27 running over a pulley on the shaft of the motor 28.

A bearing 29 similar to the bearing 18 is used to support one end of the shaft 30 while the opposite end is carried in a similar bearing 31 which is movable in the slot 32 in the boss 15. The shaft 33 is journaled in the same way and these shafts carry bevel gears 34 and 35 which mesh with the bevel gears 36 and 37 respectively which are secured to the shaft 20. A slide 38 overlies the boss 15 and has converging guide ways 39 therein which lie substantially parallel to the shafts 30 and 33. A screw 40 is threaded into the upright end of the slide 38 and is journaled in an extension 10ᵃ of the base plate 10. By turning the screw 40 the slide 38 may be moved back and forth thereby adjusting the converging ends of the shafts 30 and 33 toward or from each other.

The wheels 21 are provided with rounded faces 21ᵃ of relatively soft yielding material as a rubber composition.

It will be understood from the foregoing that the faces 21ᵃ of the wheels 21 which are preferably of the same size will be driven at different speeds because of the difference in the sizes of the bevel gears 34, 35, 36 and 37. With the shafts 30 and 33 properly adjusted so that the faces of wheels 21ᵃ are the proper distance apart, peanut kernels A are fed therebetween as shown in Fig. 1. These three wheels are all turning so as to carry the kernel A downward but at three different speeds. The result of this is that a slippage occurs between the kernel itself and the thin brown skin which surrounds it. The kernels approach the three rolls point first so that the nearest end of the kernel is gripped first. As the kernel advances, the middle of the kernel is firmly gripped and as it passes out from between the rolls, the rear end of the kernel is gripped between the rolls. The rounded face of the rolls too adds materially to the proper gripping action as well as permitting the three rolls to approach very closely without touching each other, so that even small peanuts may be thus blanched. By the time the kernel has passed through these wheels this skin becomes so loosened and broken that it separates from the kernel as the two pass the wheels and falls through the opening 12 into the bin below. This process is called blanching.

Peanut kernels to be blanched are placed in a hopper 41 which is supported by the frame 42 which also carries bearings in which is journaled a hollow revolving drum 43, the opening of which is placed in front of the shoot 41ᵃ on the hopper 41. The drum 43 carries a bevel gear 44 which meshes with a bevel pinion on the shaft 45 which is driven through a belt 46 from the motor 48. A trough 47 is placed beneath the outlet end of the drum 43. A chain 48 slides through this trough and passes around sprocket on the shaft 49 and 50, the latter being driven by means of a belt 51 from the shaft 45. One or more lugs 52 are placed on the chain 48 so as to clear the trough 47 if the peanuts pile up and get wedged therein. At the sides of the sprocket on the shaft 49 are placed flaring collars 53 so as to guide the peanut kernels after they leave the trough 47. These are so placed that the kernel A falls point first between the three adjoining wheel faces 21ª, and the blanching operation is performed as heretofore explained.

In Fig. 5 is shown a modification having two parallel shafts 54 and 55 driven by a pulley 26ª and geared together by means of gears 56 and 57. The shaft 54 has a wheel having a rubber face 21ª as was previously described. The shaft 55 carries a tight wheel 58 and a loose wheel 59, each preferably having soft rubber faces 60.

Fig. 6 shows another modification having two shafts 61 and 62 driven at different speeds and an idler shaft 63 each carrying wheels having rubber faces 21ª as in Fig. 1. Fig. 7 shows still another form having two shafts 64 and 65 placed at an acute angle to each other and driven at different speeds. These shafts carry wheels having rubber faces 21ª which converge upon a peanut A, which is engaged on the third side by a smooth flat metal strip 66, which is preferably resilient so as to yield to accommodate peanut kernels of varying size.

While I have shown and described but a few embodiments of my invention, it is to be understood that it is capable of many modifications. Changes therefore in the construction and arrangement may be made which do not depart from the spirit and scope of the appended claims.

What I claim as new and desire to secure by Letters Patent is:

1. In a peanut blancher, a plurality of wheels set at an angle to each other and lying near each other at one point so as to grip a peanut placed therebetween, and means for feeding peanuts to the space between said wheels, said wheels being rotated at different peripheral speeds.

2. In a peanut blancher, a plurality of wheels set at an angle to each other and lying near each other at one point so as to grip a peanut placed therebetween, and means for feeding peanuts to the space between said wheels, the periphery of said wheels traveling at different peripheral speeds.

3. In a peanut blancher, a plurality of wheels set at an angle to each other and lying near each other at one point so as to grip a peanut placed therebetween, and means for feeding peanuts to the space between said wheels, said wheels being faced with a yielding material.

4. In a peatnut blancher, a plurality of wheels set at an angle to each other and lying near each other at one point so as to grip a peanut placed therebetween, and means for feeding peanuts to the space between said wheels, said wheels being faced with rubber.

5. In a peanut blancher, a frame, three shafts journaled thereon and forming a triangle, a wheel carried by each shaft and so arranged that their peripheries are adjacent each other and means for driving these shafts so that their peripheries move at different speeds.

6. In a peanut blancher, a frame, three shafts journaled thereon and forming a triangle, means for adjusting the distance between the ends of two of said shafts, a wheel carried by each shaft and so arranged that their peripheries are adjacent each other, means for driving these shafts so that their peripheries move at different speeds.

7. In a peanut blancher, a frame, three shafts journaled thereon and forming a triangle, means for simultaneously adjusting the distance between the ends of two of said shafts, a wheel carried by each shaft and so arranged that their peripheries are adjacent each other, means for driving these shafts so that their peripheries move at different speeds.

8. In a peanut blancher, a plurality of wheels set at an angle to each other and lying near each other at one point so as to grip a peanut placed therebetween, and means for feeding peanuts to the space between said wheels, a plurality of said wheels being rotated at different peripheral speeds.

9. In a peanut blancher, a frame, three shafts journaled thereon and forming a triangle, a wheel carried by each shaft and so arranged that their peripheries are adjacent each other and means for driving a plurality of these shafts so that their peripheries move at different speeds.

10. In a peanut blancher, a frame, shafts journaled thereon and lying at an angle to each other, a wheel on each of said shafts, so arranged as to form an opening therebetween through which a peanut may pass and means for driving a plurality of said wheels at different peripheral speeds.

11. In a peanut blancher, a frame, shafts journaled thereon, the centers of said shafts forming a triangle, a wheel on each of said shafts, so arranged as to form an opening therebetween through which a peanut may pass and means for driving a plurality of said wheels at different peripheral speeds.

12. In a peanut blancher, a frame, shafts journaled thereon at an acute angle to each other, a wheel on each shaft, said wheels converging toward a point and a member adjacent said point which together with said wheels forms three points of contact on a peanut placed therebetween and means for turning said wheels at different peripheral speeds.

13. In a peanut blancher, a wheel adapted to engage the peanuts, said wheel having a transversely rounded face of a yielding material and means fixed relatively to said wheel for holding the peanuts in position to be engaged by said wheel, said means tending to change the speed of the peanuts relative to the speed of the face of said wheel.

14. In a peanut blancher, a wheel adapted to engage the peanuts, said wheel having a transversely rounded face of soft rubber and means fixed relatively to said wheel for holding the peanuts in position to be engaged by said wheel, said means tending to change the speed of the peanuts relative to the speed of the face of said wheel.

GUSTAVE C. KELLING.